United States Patent [19]

Fukuhara

[11] 4,290,841

[45] Sep. 22, 1981

[54] APPARATUS FOR CONTINUOUSLY FORMING A COATING LAYER ON UNBONDED PC STEEL BARS

[75] Inventor: Tetsukazu Fukuhara, Hiratsuka, Japan

[73] Assignee: Neturen Company Ltd., Tokyo, Japan

[21] Appl. No.: 64,627

[22] Filed: Aug. 7, 1979

Related U.S. Application Data

[62] Division of Ser. No. 974,513, Dec. 28, 1978.

[30] Foreign Application Priority Data

May 19, 1978 [JP] Japan .................................. 53/58874

[51] Int. Cl.$^3$ .............................................. B32B 31/00

[52] U.S. Cl. ...................................... 156/464; 83/315; 198/459; 198/461; 198/627; 414/745; 425/113

[58] Field of Search .................. 83/315, 321; 425/113, 425/114; 156/583.5, 464; 198/626-628, 461, 459, 460; 100/51, 285-286, 294; 74/103, 106, 110, 39; 414/745, 749

[56] References Cited

U.S. PATENT DOCUMENTS

| | | | |
|---|---|---|---|
| 1,809,802 | 6/1931 | Gladwin et al. | 156/187 |
| 2,287,269 | 6/1940 | Parsons | 74/110 |
| 2,679,924 | 6/1954 | Powell | 198/628 X |
| 3,120,460 | 2/1964 | Schell et al. | 156/187 |
| 3,121,361 | 2/1964 | Kramer | 83/315 |
| 3,258,110 | 6/1966 | Pilcher | 198/628 |
| 3,422,648 | 1/1969 | Lemelson | 425/113 X |
| 3,980,516 | 9/1976 | Guard | 156/515 |

FOREIGN PATENT DOCUMENTS 451583 3/1975 U.S.S.R. .............................. 198/628

*Primary Examiner*—David A. Simmons
*Attorney, Agent, or Firm*—Wenderoth, Lind & Ponack

[57] ABSTRACT

Steel bars are continuously fed along a path in a direction transverse to the bar axes, are separated by a separator and are then supplied by a roller conveyor to an axial interval regulating station. From this station each steel bar is supplied in the axial direction at regular intervals by means of sets of pinch rollers which are provided at specific intervals and which can be separately dislocated out of the path of movement of the bars and by means of a rod and a spacer fitted to the tip of a swing rod pivotally connected to the rod. Steel bars are thus delivered at regular intervals to a coating station and thereat have the entire lengths thereof, except the threaded end portions thereof, coated with a coating layer. Thereafter, the coated bars are sent to a taping station, whereat the entire lengths of the bars, including the coating layers, are tightly wrapped by a thermo-shrinking tape. Then, with movement of the steel bars, the tubular tape portion is heated by a heater, whereupon the tubular tape shrinks, thereby closely fitting around the steel bar surface including the coating layer. Thus, plural steel bars are continuously axially connected and integrated by the tape. The thus axially connected steel bars are then moved to a cutting station by a special caterpillar whose grip distance can be adjusted to the diameter of the steel bar to be transported.

3 Claims, 22 Drawing Figures

APPARATUS FOR CONTINUOUSLY FORMING A COATING LAYER ON UNBONDED PC STEEL BARS

This is a Continuation, of application Ser. No. 974,513, filed Dec. 28, 1978.

DESCRIPTION OF THE PRIOR ART

There is known a method of prestressing concrete by a post-tensioning process using unbonded prestressed concrete steel bars, wherein a coating layer of asphalt, epoxy resin or grease which does not stick to the concrete is formed over the entire length of the steel bars, except the threaded end portions thereof. Further, it is known to wrap a tape to protect the coating layer or to prevent the coating agent from adhering to other objects on the coating layer.

Conventionally, the formation of a coating layer on the prestressed concrete steel bar, over its entire length except the threaded end portion, is achieved as follows.

Asphalt which is in solid state at ambient temperature is placed in a vessel and this vessel is heated to heat the asphalt therein and to transform the asphalt into the molten state. This molten asphalt is taken out of the vessel and manually applied to one steel bar after another, forming a coating layer. Then the coating layer is spirally wrapped with a strip of kraft paper or a sheet of synthetic resin.

In this method, the molten asphalt generates irritant, harmful fumes, making the work environmentally unfavorable. This, together with manual operation, renders the work extremely inefficient.

OBJECTS AND BRIEF SUMMARY OF THE INVENTION

With the above discussion in mind, a primary object of the present invention is to provide an apparatus, which is highly reliable and highly efficient, for forming a coating layer on unbonded PC steel bars with full automation of the entire process from charging of the bars to coating and to discharging of the bars.

A further object of the present invention is to provide such an apparatus for the manufacture of unbonded PC steel bars, such that steel bars fed at irregular intervals from a charging station can be simply and accurately rearranged with regular intervals therebetween, after which the regular intervals between the bars can be maintained up to the discharging station, and whereby the action starting point in each step of the process can be exactly set.

Another object of the present invention is to provide such an apparatus for the manufacture of unbonded PC steel bars wherein a coating layer of a desired thickness with a close-fitted tape applied thereon can be automatically and accurately formed on steel bars fed at regular intervals over the entire lengths thereof, except the threaded end portions thereof, and wherein the steel bars can then be separated and transferred to a specified position.

A still further object of the present invention is to provide such an apparatus for the manufacture of unbonded PC steel bars wherein the operation of coating the steel bars to a desirable thickness, except the threaded end portions thereof, and the following operation of taping the steel bars can be automatically and swiftly executed, so that substantially no irritant, harmful fumes will be generated from the coating agent.

The present invention achieves the above objects and is constituted as follows.

Steel bars continuously fed at irregular intervals are rearranged to have regular intervals therebetween at an axial interval regulating station. Next, at a coating station only the parallel portions of the steel bars are coated by means of a flow path of a coating agent such as asphalt, epoxy resin, grease, such path being so controlled that it opens upon the arrival of the leading end of the parallel portion of a steel bar and closes upon the arrival of the trailing end of the parallel portion. Then, at a taping station a thermo-shrinking tape is unwound from a tape unwinder and is guided to be endlessly wrapped tightly around the successively supplied steel bars and the coating layers thereof. Then, at a cutting station the hollow taped portions between adjacent steel bars are cut off.

In the present invention, the axial interval regulating station is desirably constituted as follows.

At the beginning of the steel bar path there are provided two sets, fore and aft, of transmit means composed of rollers separated by a specified distance, and spacer means which oscillatingly move forward and backward between two points along the steel bar path before and after the transmit means. While the rollers of the aft transmit means are dislocated out of the steel bar path, the trailing end of a first of the successively arriving steel bars is detected as it passes a specified point behind the aft transmit means. Upon this detection, the spacer means, which is situated on the first bar at a well advanced position, withdraws axially along this bar. When fully withdrawn, the spacer means comes to the specified position between the trailing end of the first bar and the leading end of the next bar.

The speed of the next steel bar coming from the charging station is $V_0$, the transmit speed of the fore and aft transmit means each composed of a pair of pinch rollers is $V_1$, and the forward-backward moving speed of the spacer means is $V_2$, with $V_1 \approx V_2$, and $V_0 > V_1$. Thus, when the spacer means moves forward again, the leading end of the next steel bar abuts the spacer means, and the spacer means abuts the trailing end of the first steel bar. In this condition the rollers of the aft transmit means are moved back to the steel bar path. Then, the next bar is transmitted by the aft transmit means, and the first bar is transmitted by the fore transmit means, both at the speed $V_1$. When the spacer means is sufficiently advanced, it moves from between the steel bars onto the top of the next steel bar, and thereafter both bars are further supplied at an interval or spacing therebetween equal to the diameter of the spacer means.

In the present invention, the formation of a coating layer on the steel bar over the entire length thereof, except the threaded end portion or portions, is desirably achieved as follows. The arrival of the leading and trailing ends of steel bars being continuously fed at regular intervals is detected by a detector located behind the coating device.

The distance between the detector and an outflow opening for the coating agent is $l_0$, the length of the threaded end portion is $l_1$, and the feed speed of two bars is $V_1$, then the coating outflow path may be cleared at $t'=[(l_0+l_1)/V_1]-t\alpha$ seconds after the detection of the leading end of the bar, and the path may be blocked at $t=[(l_0-l_1)/V_1]-t\alpha$ seconds after the detection of the trailing end of the bar (there $t\alpha$ is a time lag in the electric machine), thereby forming a coating layer only on the parallel portion of the steel bar.

For the above coating layer formation it is desirable that there be employed a device including an outer nozzle and an inner nozzle. The outer nozzle is provided with the outflow path for the coating agent, and the outflow path is so designed that it can be opened or closed by the inner nozzle being shifted away from or toward the flow path along the steel bar path.

In the present invention, for transmission of the steel bar to the cutting station after formation of a coating layer to a desired thickness over the entire steel bar length, except the threaded end portion thereof, and the following tight wrapping of a thermo-shrinking tape around the bars including the coating layers, the following mechanism is desirably employed.

Belt conveyors, which may be chain belts stretched over spaced rotating bodies, are symmetrically disposed in vertically spaced relation with a specified spacing therebetween on opposite sides of the steel bar transmit path. In each of the belt conveyors, an upper chain holder is provided in contact with the underside of the upper belt run and a lower chain holder is provided in contact with the upper side of the lower belt run. The upper chain holder and the lower chain holder are connected through coupler means. The distance between the top side of the upper chain holder and the underside of the lower chain holder is set to be larger than the diameter of the respective rotating bodies. A fitting means provided adjacent to one end of the lower chain holder in the upper belt conveyor and a fitting means provided adjacent to the other end of the upper chain holder in the lower belt conveyor are connected by a first adjusting piece. Similarly, a fitting means provided adjacent to the other end of the lower chain holder in the upper belt conveyor and a fitting means provided adjacent to one end of the upper chain holder in the lower belt conveyor are connected by a second adjusting piece. The junction of these two adjusting pieces is pivotally connected to an X-fashion to interlock the lower chain holder of the upper belt conveyor with the upper chain holder of the lower belt conveyor, so that the two can move toward or away from each other. In this manner, the two holders are allowed to elastically move slightly away from each other within specified limits. Thus, the size of the steel bar path between the lower chain holder of the upper belt conveyor and the upper chain holder of the lower belt conveyor is made adjustable.

The cutter in the present invention is desirably constituted as follows.

A pair of devices each including a rotatable shaft, a rotatable arm with one end fixed to the shaft, a swing arm with one end coupled to a fixed shaft, and a U-shaped link having parallel portions linking the other end of the rotatable arm to the other end of the swing arm are symmetrically disposed in vertically spaced relation on opposite sides of the steel bar path. At the midpoint of the opposed parallel portions of each link is located a pointed flying cutter consisting of a heater. These cutters thermally cut the hollow tubular taped portion between adjacent steel bars.

BRIEF DESCRIPTION OF THE DRAWINGS

Other objects, features and advantages of the present invention will become more apparent from the following detailed description, made in conjunction with the attached drawings, wherein:

FIG. 2(*b*) is a side view of the device of FIG. 2(*a*);

FIG. 7(*b*) is an enlarged oblique view illustrating the relationship between the guide pipe and the welder constituting the taping device shown in FIG. 7(*a*);

FIG. 7(*c*) is a sectional view taken along line 7*c*–7*c* in FIG. 7(*b*);

FIG. 8(*b*) is a sectional view taken along line 8*b*—8*b* in FIG. 8(*a*);

FIG. 8(*c*) is a sectional view taken along line 8*c*—8*c* in FIG. 8(*a*);

DETAILED DESCRIPTION OF THE INVENTION

The present invention will now be described in detail with reference to the embodiment thereof illustrated in FIGS. 1 through 10.

Figure 1:
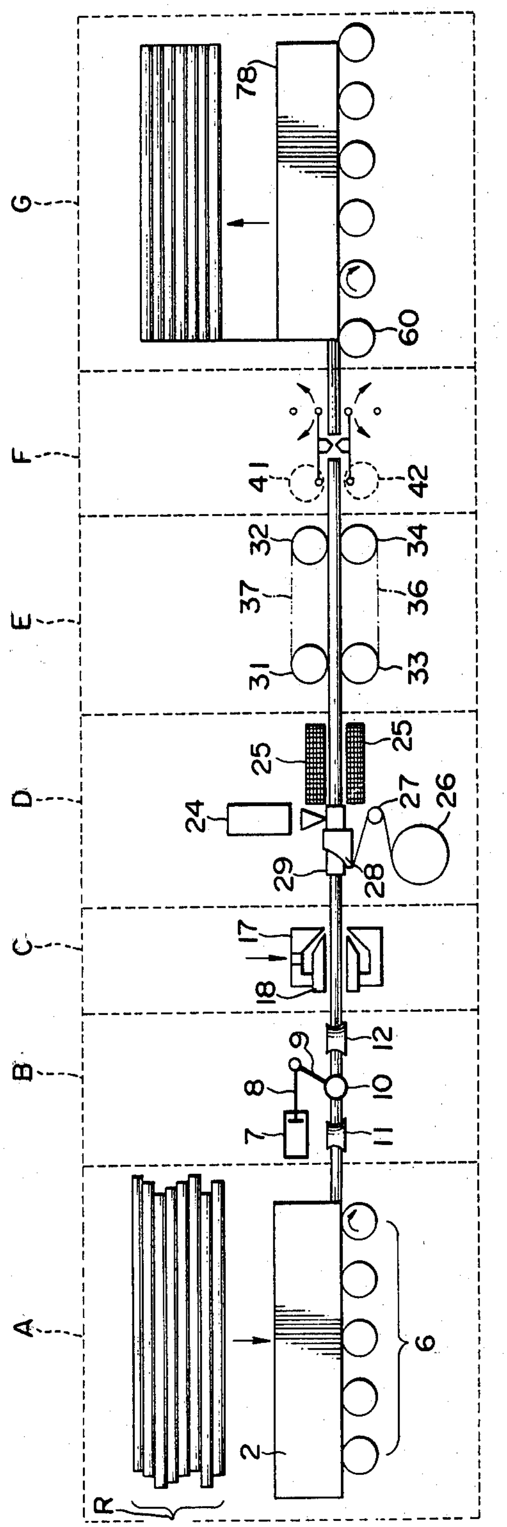
FIG. 1 is a schematic diagram showing the entire system according to the present invention.

In FIG. 1, showing the entire system according to the present invention, A is the charging station to feed unbonded prestressed concrete steel bars (hereafter referred to as steel bars) onto which a coating layer is to be formed.

Steel bars R are continuously fed in transverse fashion along, e.g., an inclined path, are separated one by one by the separator 2, and are transmitted on the roller conveyor 6 to the axial interval regulating station B. At the station B, upon control signals issued at specific intervals the steel bars carried along on the roller conveyor 6 are separately rearranged so that they can be transmitted in the axial direction at regular intervals one after another, by means of a set of pinch rollers 11 and 12 which can be displaced outwardly at right angles to the moving direction of the bars, a cylinder 7 having a rod 8, and a spacer 10 which is provided at the tip of a swing rod 9 which is pivotally connected to rod 8. At the coating station C, the steel bars are fed at regular intervals and are coated with asphalt, epoxy resin or grease on the necessary length portions of the bars, except the threaded end portions thereof, by the specified action of a coating device consisting of a fixed outer nozzle 17 and a movable inner nozzle 18. The bars are then sent on to the taping station D.

At the taping station D, by means of a tape unwinder 26, a tape guide roller 27, taping guide pipes 28 and 29, and a welder 24, a thermo-shrinking tape is tightly wrapped around the coating layer of the steel bars fed at regular intervals. Then, as the steel bars progress, a heater 25 heats the tubular tape so that the tape shrinks and closely fits around the bars, including the coating layer. Thus, each steel bar R, coated except on the threaded portion thereof, is integrated via the tape to another steel bar R, following at a regular interval, and this integrated unit moves along the system. This integrated unit of steel bars R is sent to the cutting station F by a special caterpillar device E having a grip spacing which is adjustable to the diameter of the steel bars.

At the cutting station F, the cutters 41 and 42, acting at a signal from a detector in the form of a photoelectric element, cut the hollow tubular tape portion between adjacent steel bars which are successively fed at regular intervals. Thus, one coated and taped steel bar can be cut off from another succeeding steel bar and can be separately placed on a roller conveyor 60 of the bar discharging station G, to be kicked by the kicker 78 to move in a specified direction from the path through the system.

The above process takes place continuously and automatically during the movement of the steel bars from the charging station A to the discharging station G.

The specific constituting and function of the structural elements of the system shown in FIG. 1 are hereinafter described with reference to FIGS. 2(*a*) through 8.

Figure 2:
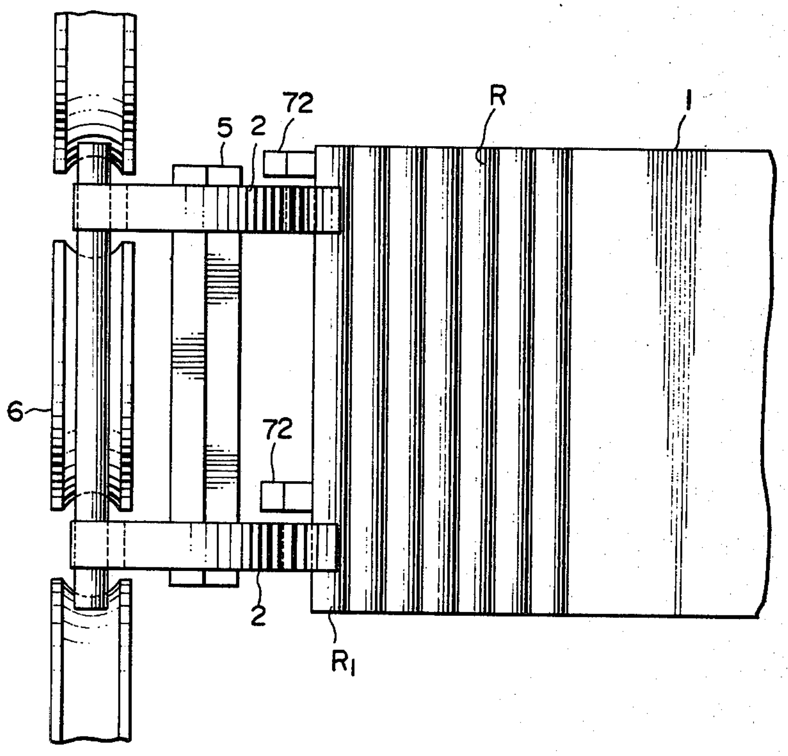
FIG. 2(*a*) is a plan view showing a steel bar separator used in the system of the present invention.
Figure 2B:
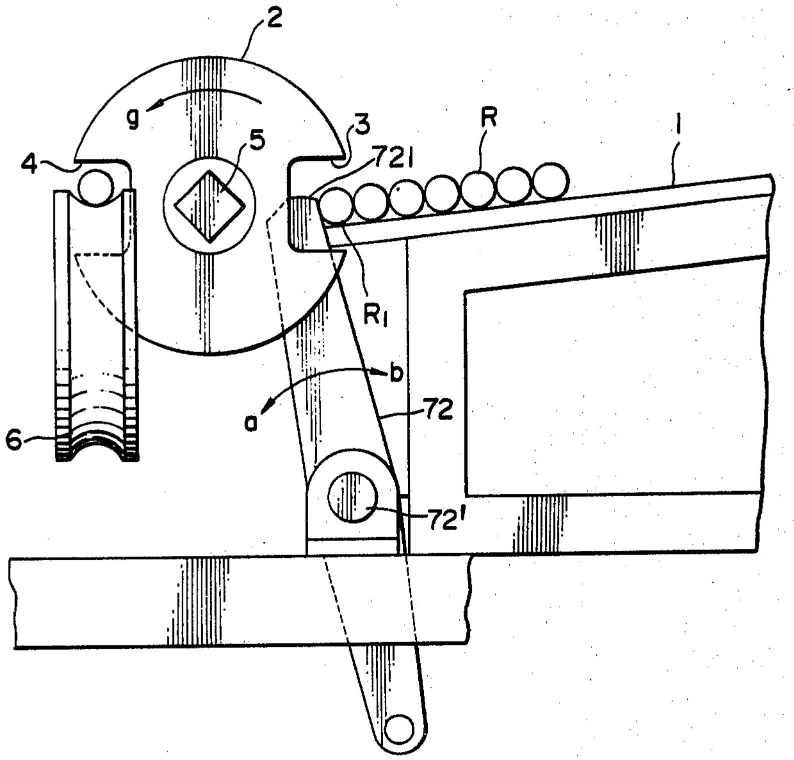

FIGS. 2(*a*) and (*b*) show the details of the charging station A, wherein 1 is an inclined plate to allow the steel bars R to move by gravity, 2 is a separator which separates the bars moving along the inclined plate 1 one by one and places them on the roller conveyor 6. The separator 2 is formed of circular members 2 which are spaced at a specified interval. Each member 2 has therein notches 3 and 4 which extend toward the axial center of each member from the periphery thereof, and which are spaced, e.g. 180°, apart. Between each of the members 2 and the inclined plate 1 there is installed a stopper 72 adjacent to the member 2. Each steel bar stopper 72 is so fitted as to be rotatable around the respective fulcrum 72' in the direction a⇄b. The tip of each stopper 72 can rotate in the direction a⇄b to supply a steel bar into the respective adjacent notch 3 or 4 in each member 2.

Thus, the shape and size of the notch 3 or 4 and the stopper 72 can be so set that, when the first steel bar $R_1$ moving along the inclined plate 1 abuts the stopper 72, only this first bar $R_1$ will fit within the notch 3 or 4, the other, following bars still being located outside of the notch 3 or 4. This can also be achieved by adjustment of the amount of rotation of stopper 72 around the fulcrum 72' in the direction a⇄b. The member 2 is so designed that it can intermittently turn around the axis 5 in the direction of arrow g by 180°. Upon 180° rotation of the member 2, the first steel bar is shifted from the position of the notch 3 to the position of the notch 4, as shown in FIG. 2(*b*), and is placed onto the roller conveyor 6. Then, the second steel bar moves into the notch 4, which has turned to be located in the position of the notch 3 as shown in FIG. 2(*b*), and upon the next 180° intermittent rotation of the member 2, such second steel bar is placed onto the roller conveyor 6.

Thus, if the intermittent rotation of the separator is appropriately related to the feeding of the steel bars by the rotation of the roller conveyor 6, the steel bars separated by the separator 2 will be successively carried on the roller conveyor 6.

Figure 3:
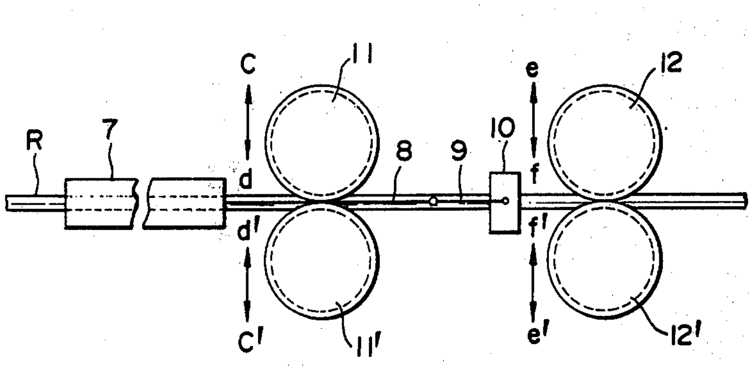
FIG. 3 is a plan view of the axial interval regulating device for the steel bar used in the system of the present invention.

The end positions of the steel bars supplied one after another along the inclined plate 1 are irregular, and accordingly the intervals on the roller conveyor 6 between adjacent steel bars is equally irregular. However, this irregularity is corrected by the axial interval regulating device shown in FIGS. 3 through 5(*d*). As illustrated in FIG. 3, the axial interval regulating device includes a first set of pinch rollers 11 and 11', a second set of pinch rollers 12 and 12' provided at a specified distance ahead or downstream of the rollers 11 and 11', with respect to the direction of movement of the steel bars, and spacer 10 provided at the tip of swing rod 9 pivotally connected to the tip of the rod 8 of the cylinder 7. The spacer 10 is a short stem of, e.g. circular section which is positioned to axially extend at approximately a right angle to the direction of movement of the steel bars. The two sets of pinch rollers 11, 11' and 12, 12' are movable from the steel bar path in the directions indicated by arrows c⇄d, c'⇄d' and e⇄f, e'⇄f', respectively, as shown in FIG. 3. Thus, when pinch rollers 11, 11' and 12, 12' are displaced outwardly, i.e. in the directions c, c' or e, e' (hereafter referred to as "pinch roller open"), the spacer 10 may be readily moved along the steel bar path between the sets of pinch rollers 11, 11' and 12, 12'.

Figure 4:
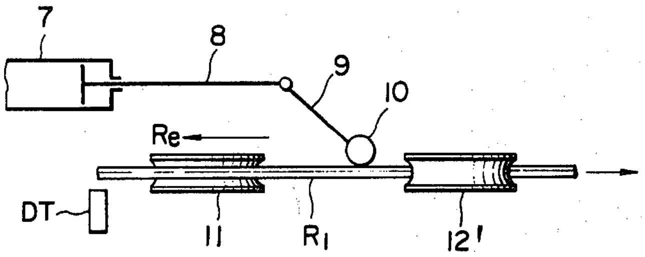
FIGS. 4(*a*)-(*e*) and 5(*a*)-(*d*) are respectively elevation views and plan views illustrating the function of the axial interval regulating device.
Figure 4:
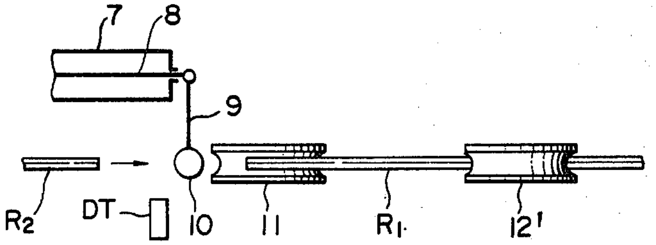
Figure 4:
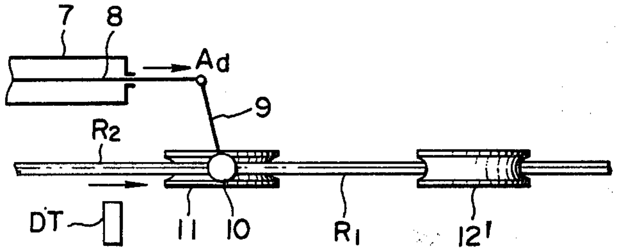
Figure 4D:
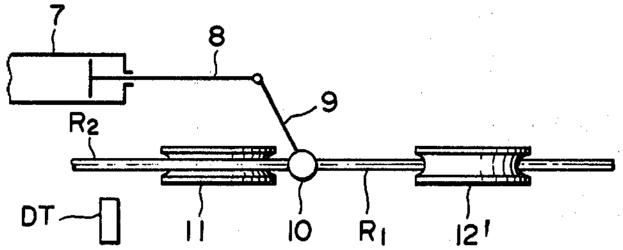
Figure 4E:
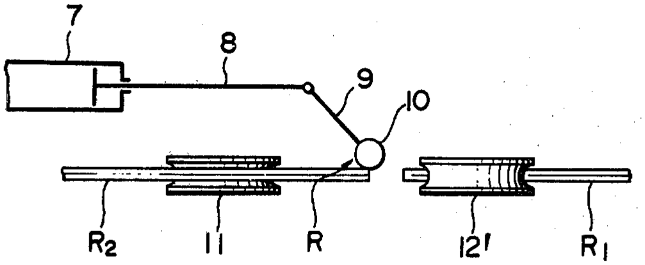
Figure 5A:
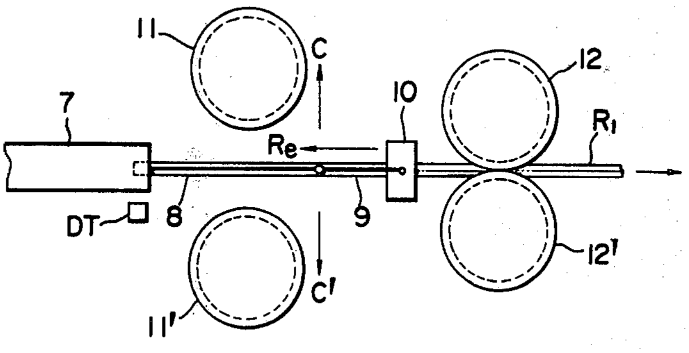
Figure 5B:
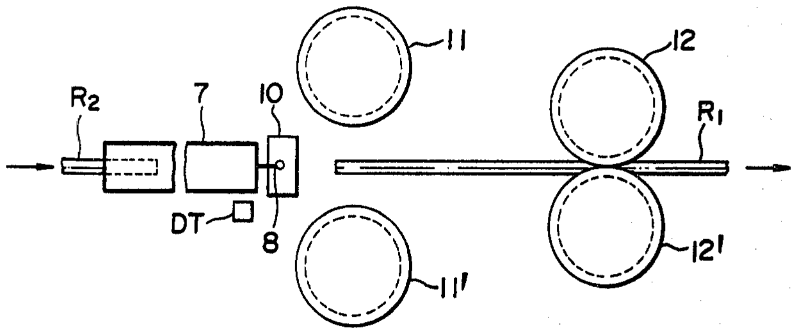
Figure 5C:
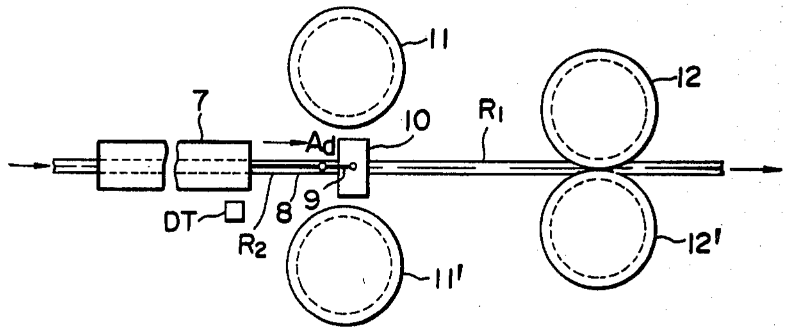
Figure 5D:
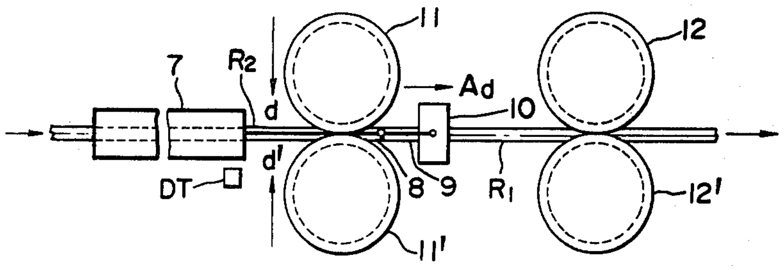

In FIGS. 4(*a*) and 5(*a*) the arrival of the tail or trailing end of the steel bar $R_1$ is detected by an electromechanical detector DT, such as a known photo-detection device or a limit switch. Upon a signal from this detector a drive, not shown, acts to open the pinch rollers 11 and 11' in the directions c and c', respectively. In the state before reception of the signal that the tail end of the bar $R_1$ has been detected by DT, the rod 8 of the cylinder 7 is well advanced or extended out of cylinder 7, and the spacer 10 is in contact with the top side of the bar $R_1$ at a position between the sets of pinch rollers 11, 11' and 12, 12'. When the rod 8 of the cylinder 7 is withdrawn in the direction of arrow Re upon reception of such signal, the spacer 10 moves backward along the steel bar $R_1$, and passes between the open pinch rollers 11 and 11', and when the rod 8 is fully withdrawn or retracted into cylinder 7, the spacer 10, as indicated in FIGS. 4(*b*) and 5(*b*), is positioned near the rear or upstream end of the pinch rollers 11 and 11'. Thus, the tail end of the steel bar $R_1$ will be positioned just ahead of the rear end of the pinch rollers 11 and 11'.

In this condition, the succeeding steel bar $R_2$ is advanced to a position such that its leading end is located close to the spacer 10. After a specified duration of this condition, the rod 8 of the cylinder 7 is advanced out of the cylinder 7. If the bar feed speed due to the pinch rollers 11, 11' and 12, 12' is $V_1$ (constant), if the forward moving speed of the rod 8 of the cylinder 7 is $V_1(\approx V_2)$, and if the bar feed speed due to the roller conveyor 6 is $V_0$, with $V_0 > V_1$, then in the condition of FIGS. 4(*b*) and 5(*b*) the bar $R_1$ will be moved at the speed $V_1$ by the closed pinch rollers 12, 12', and the bar $R_2$ will be moved at the speed $V_0$ by the roller conveyor 6, which means that the bar $R_2$ moves faster by $V_0 - V_1$ than the bar $R_1$. Therefore, if the practical speeds mentioned above are appropriately set, the bar $R_2$ will abut the spacer 10 and further push the spacer 10 which is supported by the swing rod 9. As a consequence, as indicated in FIGS. 4(*c*) and 5(*c*), the trailing end of the bar $R_1$ and the leading end of the bar $R_2$ will each be abutted with and will be separated by the spacer 10 at a position about midway between the open pinch rollers 11 and 11'. When in this condition both bars $R_1$ and $R_2$ continue to move, and the bar $R_1$ will move at $V_1$, i.e. the speed of pinch rollers 12, 12', while the bar $R_2$ will be decelerated from $V_0$, i.e. the speed of roller conveyor 6, to $V_1$, i.e. the speed of the rod 8 of the cylinder 7.

Then by appropriately setting the time between the detection of the trailing end of the bar $R_1$ by DT and passage of the spacer 10 between the pinch rollers 11 and 11', the pinch rollers 11 and 11' are displaced in the directions d and d', respectively, by a drive (not shown) and thus they are closed. In this condition the bar $R_1$ and the bar $R_2$ will both be moved at $V_1$ respectively by the pinch rollers 12, 12' and by the pinch rollers 11, 11'. When the rod 8 of the cylinder 7 is fully advanced outwardly of cylinder 7 and the spacer 10 comes to be positioned between the rollers 11, 11' and 12, 12', the rod 8, as seen from FIGS. 4(*d*) and 5(*d*), will no longer be able to advance. Thus, with further progress of $R_1$ and $R_2$, the spacer 10 will climb up onto the top of the leading end of $R_2$, as shown in FIG. 4(*e*). In this condition, as stated above, the steel bar $R_1$ is transmitted by the pinch rollers 12, 12' and the steel bar $R_2$ is transmitted by the pinch rollers 11, 11', both at the speed $V_1$. Therefore, even when the spacer 10 moves out from between $R_1$ and $R_2$, an interval equal to the diameter of the spacer 10 will be maintained between the trailing end of $R_1$ and the leading end of $R_2$. Thereafter, both $R_1$ and $R_2$ are moved at the same speed $V_1$, and the two bars are maintained at the interval equal to the diameter of the spacer 10 until they are discharged at the discharging station. The axial interval regulating device allows for adjustment of the interval between the steel bars by changing the spacer 10 for bars of different sizes. In the case of a steel bar with rolled threads at both ends the outer diameter of the threaded portion is larger than the diameter of the parallel or unthreaded portion. In such case it is advisable to install a bar end arrival detector at a specified spot behind the pinch rollers 12, 12' and to permit passage of the threaded portions at the leading and trailing ends of the steel bar by so controlling the pinch rollers that at a specific time after detection of the arrival of an end of the bar by the detector the pinch rollers 12 and 12' may be moved in the directions e, e' out of the path of the threaded portions.

Steel bars spaced at axially regulated intervals as discussed above are then coated with asphalt, etc. to form a coating layer RC at the coating station C. The coating device includes a photoelectric detector 13 to detect the arrival of a steel bar, a nozzle assembly including outer nozzle 17 and inner nozzle 18, and a nozzle open-close mechanism to axially move inner nozzle 18 in the direction of movement of the steel bar, the details of the device being shown in FIG. 6.

Detector 13 is installed along the steel bar path in a nozzle assembly 14. A known photoelectric element or an electromechanical device such as a limit switch may be used as the detector. The nozzle assembly 14 is composed of the outer nozzle 17 and the inner nozzle 18. The outer nozzle 17 is a hollow tube equipped on the exterior thereof, at an axially midpoint location, with an annular chamber 141 to hold the coating. Heaters 16 are attached to opposite axial sides of the chamber 141 and cooperate with an annular cooling or heating medium tube 142 provided within the coating agent chamber 141 to maintain the coating agent within chamber 141 at a specified temperature. The inner diameter of the outer nozzle 17 is largest at 171, i.e. the left side in FIG. 6, the inner diameter diminishes at a middle portion 172, and at the right side in FIG. 6 the inner diameter further diminishes to a small diameter 173. The inner diameter of the outer nozzle 17 is the smallest at the extreme right side in FIG. 6, i.e. at 174, which is slightly larger than the inner diameter of the inner nozzle 18. Between the small diameter portion 173 and the smallest diameter portion 174 is formed an annular coating agent path 20 which has a funnel-like section and which communicates with the coating agent chamber 141. The inner nozzle 18 is also a hollow tube which is located within the hollow portion of the outer nozzle 17 to slidably contact the annular wall at the small diameter portion 173 of the outer nozzle 17. As shown at the left side in FIG. 6, the inner nozzle 18 has a flange 181 which is attached by threads 184. Leftward movement of flange 181 is restricted by the stopper 182 provided at the left side of the assembly 14. A gap is maintained between the internal walls 171 and 172 of the outer nozzle and the opposed external walls of the inner nozzle. A spring S is inserted in such gap to abut the flange 181 and the step 173' between portions 172 and 173. A linkage 19 has one end pivotally connected to the tip of a rod 23' of a cylinder 23 and a top end pivotally connected to the top end of a support SP. The left end of the inner nozzle 18 can be pushed rightwardly in FIG. 6 by a push pin 21 located at a specified position to the right of the linkage 19 in FIG. 6. Therefore, when the cylinder rod 23' is retracted into cylinder 23, the inner nozzle 18 can be moved rightwardly in FIG. 6 against the force of the spring S by the linkage 19. Then the inner nozzle 18 slides along the internal wall of the small diameter portion 173 of the outer nozzle, and in consequence the tip of the tapered portion 183 at the right end of the inner nozzle 18 moves into tight contact with the left internal wall of the smallest diameter portion 174 formed at the top of the outer nozzle 17, thereby blocking the coating agent path 20. When rod 23' is advanced outwardly from cylinder 23, the linkage 19 ceases to push the inner nozzle 18 rightwardly in FIG. 6, and in consequence the inner nozzle 18 is shifted to the left by the force of the spring S, whereupon the tip of the inner nozzle 18 separates from the opposed wall of the outer nozzle 17, and the coating agent path is cleared.

Usually, an anchor thread Rt is cut in both ends of the steel bar. Therefore, the unbonded steel bar has to be coated on only the parallel portion and not on the threaded portions. For this purpose, according to the present invention a detector to detect passage of the leading and trailing ends of the steel bar is provided along the steel bar path upstream from the coating device, taken in the direction of bar movement. For instance, a photoelectric element 13 is provided, and upon a detection signal from element 13 the coating agent path 20 is blocked or cleared by the inner nozzle 18.

Figure 6:
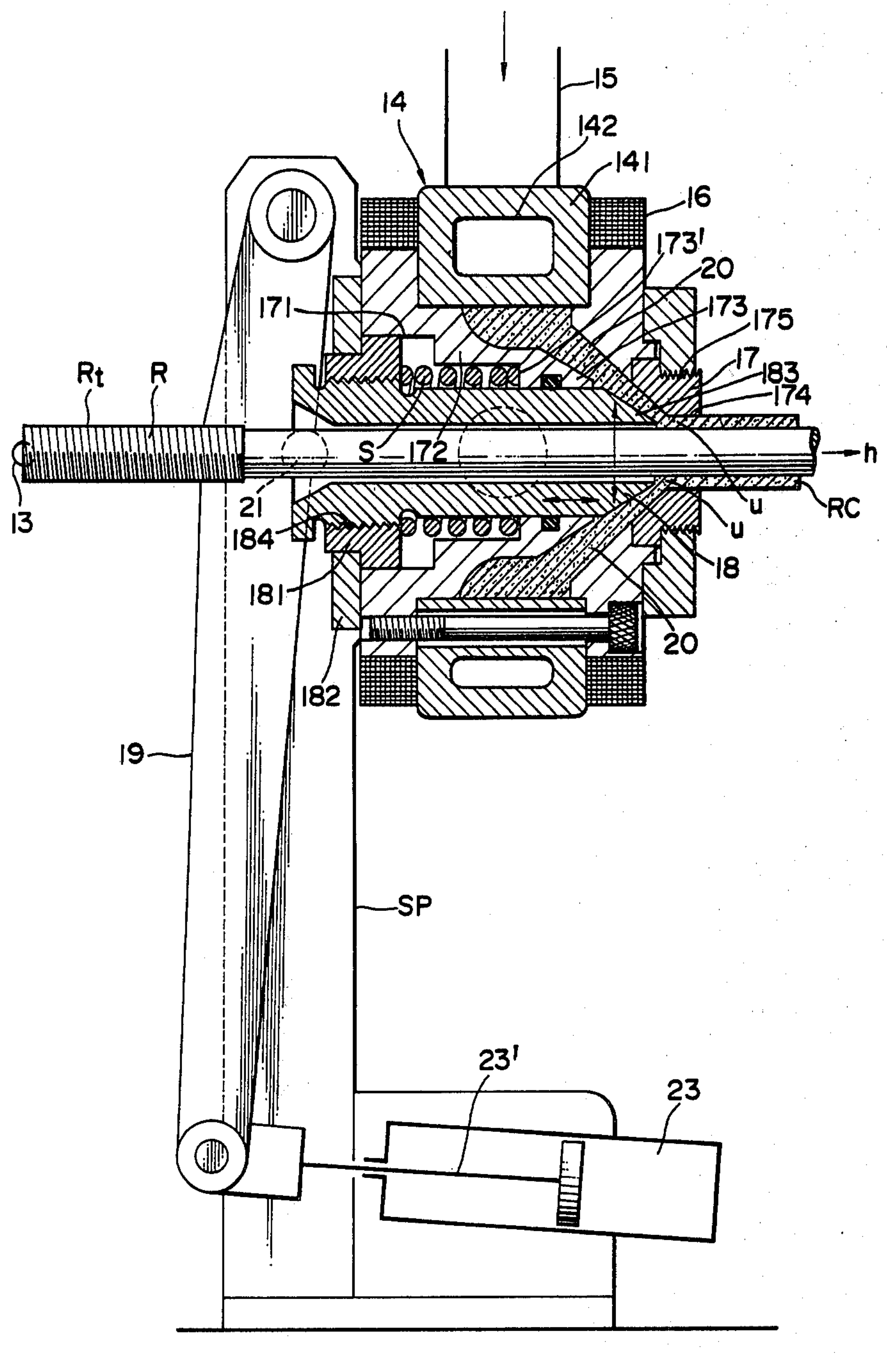
FIG. 6 is a longitudinal sectional view of a coating device preferably used in the system of the present invention.

In FIG. 6 the coating agent path 20 is shown "open", and with progress of the steel bar in the direction h, the coating layer RC is formed on the parallel portion of the steel bar. Eventually the photoelectric element 13 will detect passage of the trailing end of a steel bar. Then, in t seconds after the detection signal has been issued from the element 13, the cylinder 23 will be driven to shift the inner nozzle 18 rightwardly, thereby blocking the coating agent path 20. The above mentioned time t is set as follows.

With the distance between the photoelectric element 13 and the coating agent outflow u being $l_0$, the length of the noncoated portion of the steel bar, i.e. the threaded portion Rt at the trailing end, being $l_1$, and the bar feed speed being $V_1$, then $$t + t\alpha = (l_0 - l_1)/V_1$$

$t=[(l_0-l_1)/V_1]-t\alpha$ where tα is a constant time lag in the electric and mechanical systems. When element 13 detects passage of the leading end of the steel bar R, then in t' seconds after the detection signal has been issued, the inner nozzle 18 will be shifted leftward, thereby clearing the coating agent path 20. In this case the timing is set such that $t'=[(l_0+l_1')/V_1]-t\alpha$, where $l_1'$ is the length of the threaded portion at the leading end of the steel bar. The annular member which forms the smallest diameter portion 174 of the outer nozzle 17 is attached by threads 175, and the annular member which forms the inner nozzle 18 is attached by threads 184 to the flange 181. By using these two annular members of different inside diameters, different diameters of steel bars R to the coated can be accommodated, and a coating layer of a desired thickness can be formed on steel bars of different diameters.

Figure 7A:
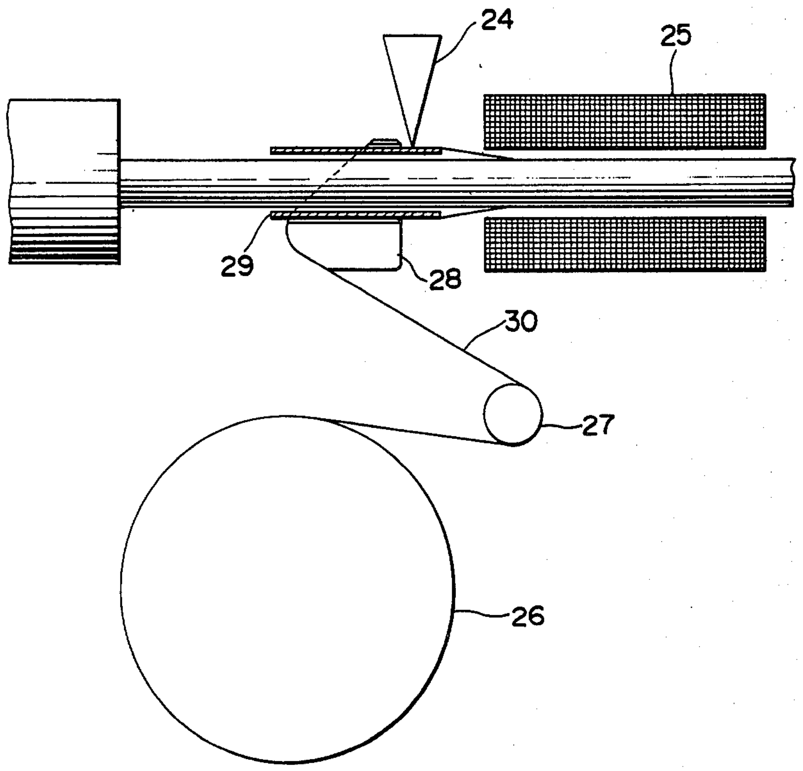
FIG. 7(*a*) is a sectional elevation view, partially in section, of a taping device preferably used in the system of the present invention.
Figures 7B, 7C:
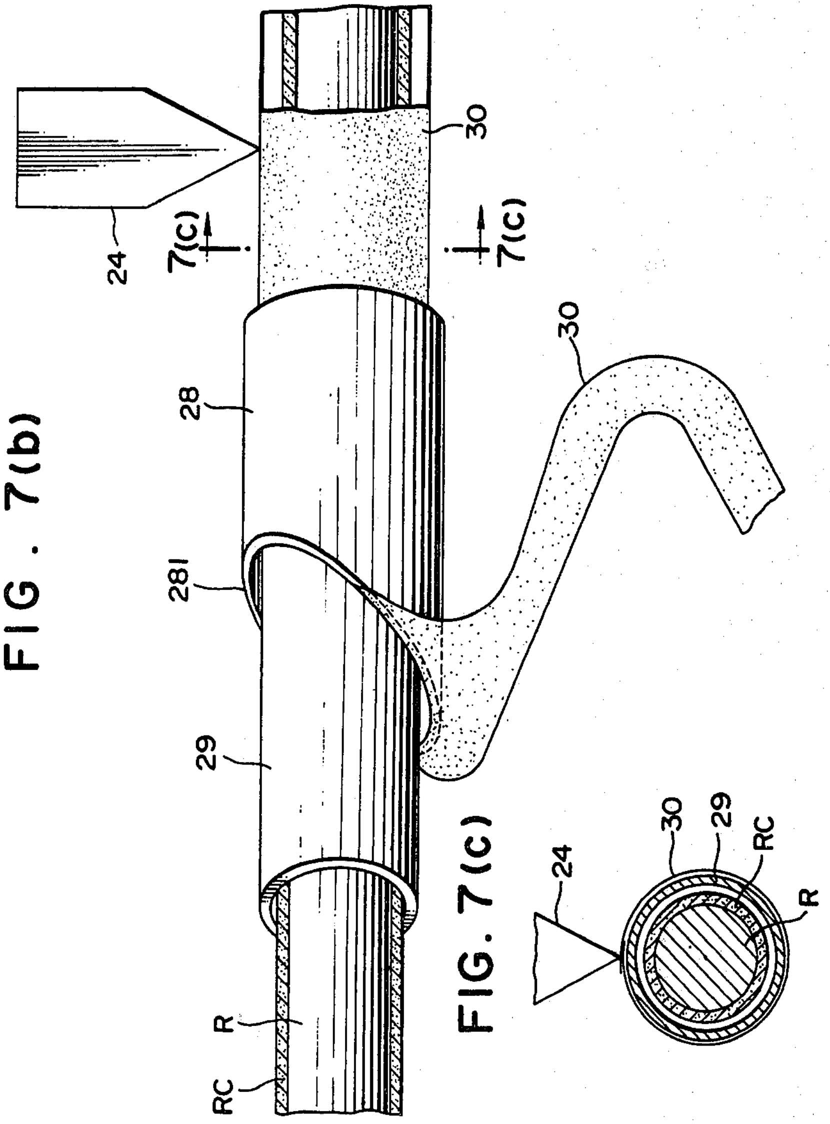

After the parallel portion of a steel bar is thus coated, the taped portion is wrapped with a thermo-shrinking tape during further axial movement of the steel bar. The taping device, as illustrated in FIG. 7(*a*), includes tape unwinder 26, tape guide pipes 28 and 29, welder 24 and a tunnel heater 25.

Thermo-shrinking tape 30 is unwound from the unwinder 26, and as the tap 30 moves along the guide roller 27 and passes between the two guide pipes 28 and 29, it is wrapped onto the coating layer RC on the moving steel bar R. As seen from FIG. 7(*b*), the inside diameter of the guide pipe 29 is larger than the outside diameter of the steel bar R including the coating layer RC, and the length of pipe 29 is set at a specified value. The inside diameter of the guide pipe 28 is larger than the outside diameter of the guide pipe 29. Therefore, the guide pipe 29 can be placed within the hollow portion of the guide pipe 28, with a specified annular spacing therebetween. The left end of the guide pipe 29, as shown in FIG. 7(*b*), extends by a specified length to the left beyond the left end of the guide 28, and the left wall 281 of the guide pipe 28 is inclined upwardly. The unwinder 26 unwinds a thermo-shrinking tape 30 wide enough to loosely cover the steel bar including the coating layer RC, and tape 30 moves along the guide roller 27 and into the gap between the guide pipes 28 and 29. While the tape 30 moves rightwardly in the gap between the guide pipes 28 and 29, tape 30 is spirally wrapped around the bar with opposite lateral edges of the tape overlapping. When tape 30 passes out from the right-hand end of the guide pipe 28, an ultrasonic welder 24 thermally fuses the overlapped edges of the tape, as indicated in FIG. 7(*c*), with the guide pipe 29 acting as a work stand or base. Thereafter, tape 30 is discharged out of the guide pipe 29.

At this stage the tape 30 is not yet tightly fitted to the coating layer. The tubular tape 30 and the steel bar with the coating layer RC are simultaneously advanced and heated at the tunnel heater 25. The thus heated tape 30 thereby shrinks inwardly in the direction of the coating layer RC and tightly fits around the coating layer RC. When the diameter of the steel bar R with the coating layer RC formed thereon is changed, adjustment to compensate for this difference in diameter can be easily made by employing a tape 30 with a different appropriate width and guide pipes 28 and 29 with different appropriate diameters.

Figure 8A:
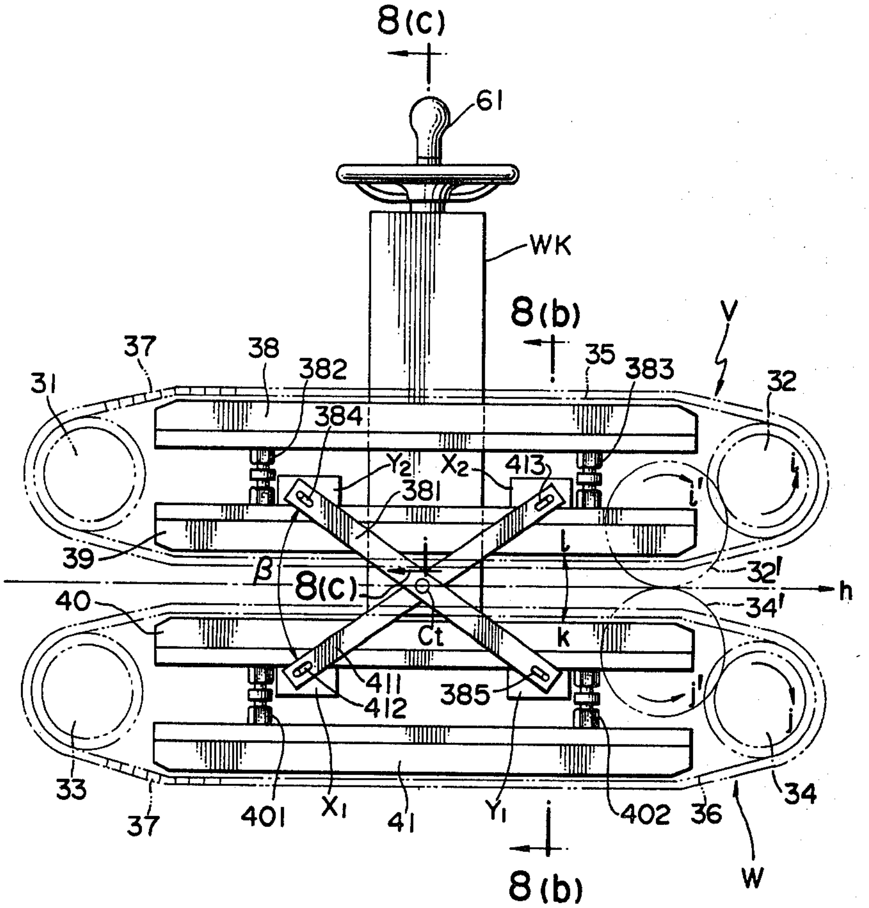
FIG. 8(*a*) is an elevation view of a caterpillar preferably used in the system of the present invention.
Figure 8B:
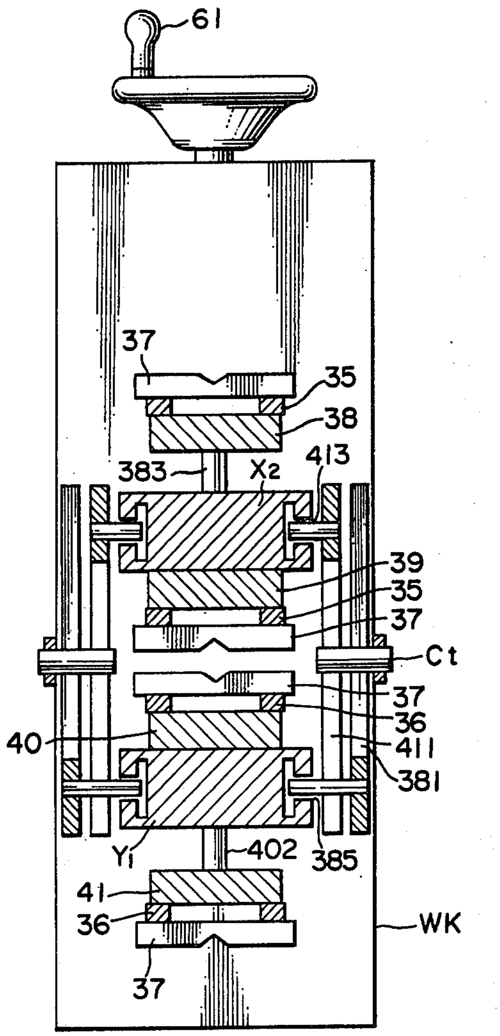
Figure 8C:
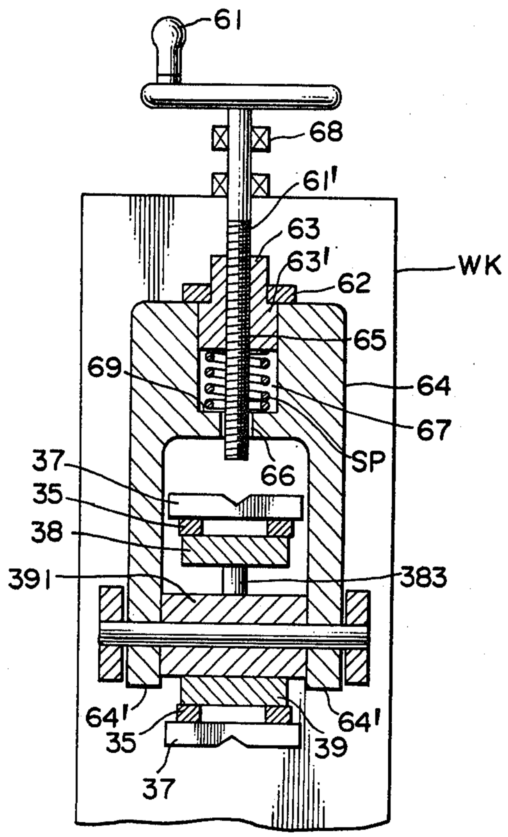

The steel bar with the tape 30 tightly fitted to the coating layer RC is then carried by the caterpillar E to the cutting station. For this purpose a caterpiller designed as illustrated in FIGS. 8(*a*) through 8(*c*) may be employed.

The caterpillar includes a conveyor belt V, formed by a chain belt 35 stretched over spaced rotating bodies 31 and 32, and a conveyor belt W, formed by a chain belt 36 stretched over spaced rotating bodies 33 and 34. Belts 35 and 36 are symmetrically disposed in vertically spaced relation on opposite sides of the steel bar path h, with a specified vertical spacing between each other.

Between the rotating bodies 31 and 32 there are installed an upper chain holder 38 and a lower chain holder 39, so that bodies 31 and 32 engage the inner side of the chain belt 35. The upper chain holder 38 and the lower chain holder 39 are coupled by members 382 and 383, with a specified spacing from each other, such that the distance between the top side of the upper chain holder 38 and the underside of the lower chain holder 39 is larger than the diameter of the rotating bodies 31 and 32. The outer surface of the chain belt 35 is provided over the entire length thereof with a tread 37 of, e.g., urethane rubber to soften the contact with the coated steel bar R.

The conveyor belt W is of the same symmetrical constitution as the conveyor belt V, holders 38 and 39 of the conveyor belt V corresponding to holders 40 and 41 of the conveyor belt W, and members 382 and 383 corresponding to members 401 and 402. The steel bar is transmitted, with the zone defined by the lower chain holder 39 of the conveyor belt V and the upper chain holder 40 of the conveyor belt W, upon which the surface tread 37 is formed, as the effective contact range between the caterpillar and the steel bar. When a drive wheel 32' is rotated in the direction i' and a drive wheel 34' is rotated in the direction j' by a drive not shown in the drawings, the rotational motion of these drive wheels causes the rotational motion of the rotating bodies 32 and 34 in the direction of arrows i and j, respectively, and thereby the conveyor belts V and W are driven.

The steel bar R moving along from the left in FIG. 8(*a*) is sent on to the right by the chains 35 and 36, with the distance between the lower chain holder 39 of the conveyor belt V and the upper chain holder 40 of the conveyor belt W defining the effective contact range. When steel bars of different diameters are to be carried through the caterpillar, the distance between the lower chain holder 39 of the conveyor belt V and the upper chain holder 40 of the conveyor belt W is adjusted by adjusting means including adjusting pieces 381 and 411. The bottom end of the adjusting piece 411 is pivotally connected via a guide groove 412 to a fitting member $X_1$ provided at a specified position adjacent to one end of the upper chain holder 40 of the conveyor belt W, and the top end piece 411 is pivotally connected via a guide groove 413 to a fitting member $X_2$ provided at a specified position adjacent to the opposite end of the lower chain holder 39 of the conveyor belt V. Likewise, the top end and the bottom end of the adjusting piece 381 are respectively pivotally connected via guide grooves 384 and 385 to a fitting member $Y_2$ provided at a specified position adjacent to one end of the lower chain holder 38 of the conveyor belt V and to a fitting member $Y_1$ provided at a specified position adjacent to the opposite end of the upper chain holder 40 of the conveyor belt W. The centers of adjusting pieces 381 and 411 are respectively pivotally connected at a center Ct, in an X-fashion at an angle β, and they are rotatable in directions k⇌l around center Ct.

The distance between the lower chain holder 39 of the conveyor belt V and the upper chain holder 40 of the conveyor belt W is adjustable by operation of.a handle 61 shown in FIG. 8(*a*). Concurrently, WK shows the operation mechanisms in FIG. 8(*a*). Details of the operation are explained referring to FIGS. 8(*b*) and 8(*c*).

In FIG. 8(*c*), 63 is a working piece with a through hole 65 which engages the thread formed around the stem 61' provided at the lower part of the handle 61, and 64 is a moving piece. Legs 64' provided at both ends of the lower part of moving piece 64 are connected to the lower chain holder 39 of the conveyor belt V through a coupling member 391. The upper part of moving piece 64 has a through hole 67 of a large enough diameter to permit the working piece 63 to slide therein. In the lower part of through hole 67 there is provided a flange 69 with a small through hole 66 to permit passage of the stem 61'. A spring SP with a specific spring constant is inserted between the underside of the working piece 63 and the flange 69. Onto the top part of the moving piece 64 is fixed a hollow adjusting piece 62 by means of a bolt or the like. The inner wall of the hollow adjusting piece 62 is designed to be of such a size that it can slide along the upper small diameter portion of the working piece 63. Therefore, downward shifting of the adjusting piece 62 is prevented by the lower large diameter portion 63' of the working piece 63. When the handle 61 is turned in a specified direction, the stem 61' turns in the same direction as the handle 61, and the working piece 63 engaged with stem 61' is displaced downwardly while sliding along the large diameter through hole 67 of the moving piece 64. As a result, the spring SP is compressed to cause a downward displacement of the moving piece 64. Between the moving piece 64 and the lower chain holder 39 there is provided the upper chain holder 38, but since the distance between the legs 64' of the moving piece 64 is set sufficiently larger than the width of the upper chain holder 38, the moving piece 64 can displace the lower chain holder 39 downwardly without being influenced by the presence of the upper chain holder 38. The downward displacement of the moving piece 64 causes a downward displacement of the lower chain holder 39 by means of the coupling member 391. As a consequence, the adjusting pieces 381 and 411 are displaced in the direction of being drawn closer toward each other. Thus, by the rotation of the handle 61 in the specified direction the distance between the conveyor belts V and W, which depends on the lower chain holder 39 of the conveyor belt V and the upper chain holder 40 of the conveyor belt W, can be regulated. In this condition the underside of the adjusting piece 62 and the top side of the opposite moving piece 64 are in contact with each other. Therefore, even if the distance between the conveyor belt V and the conveyor belt W, which depends on the lower chain holder 39 of the conveyor belt V and the upper chain holder 40 of the conveyor belt W, is set to be equal to the diameter of a steel bar at the parallel portion thereof, including the coating layer, the moving piece 64 will be displaced upwardly against the force of the spring SP, when a steel bar slightly thicker than the set distance between the belts V and W passes therebetween. After such steel bar passes between the belts, the moving piece 64 will be displaced downwardly by the force of the spring SP, thus returning to the position of FIG. 8(*c*) in which the adjusting piece 62 contacts the large diameter portion of the working piece 63. Thus, a larger size steel bar can be moved through the caterpillar without hindrance. When such steel bar clears the caterpillar, the preset state is restored.

In this way the caterpillar according to the present invention not only permits the width of the steel bar path to be set arbitrarily but also permits it to be slightly adjusted by inherent elasticity when the diameter of the bar slightly changes.

Figure 9:
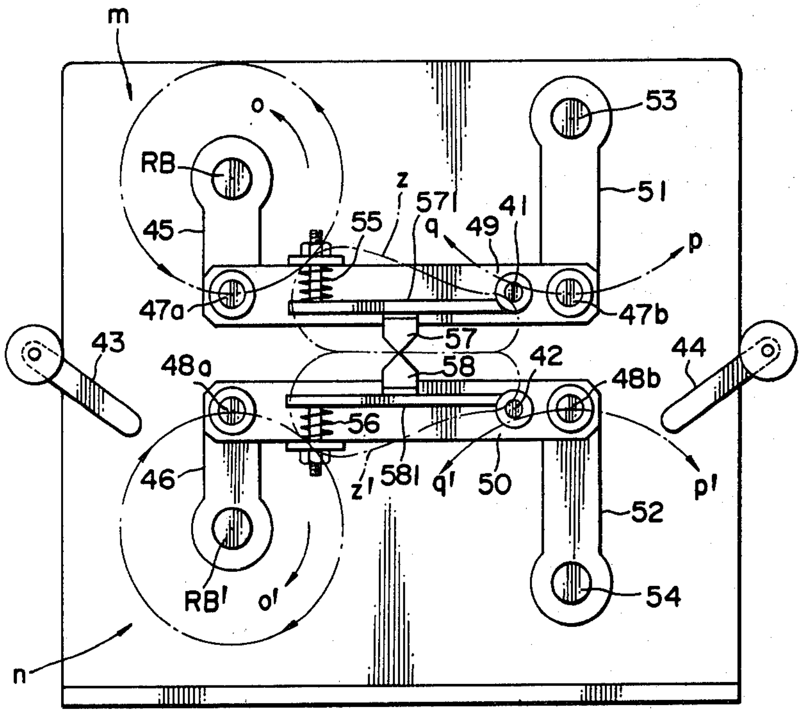
FIG. 9 is an elevation view of a cutting device preferably used in the system of the present invention.

The taping device wraps an endless tape around successively supplied steel bars R. Thus, a plurality of steel bars R discharged from the taping device are an integral unit sheathed in a single continuous tubular tape, and the hollow taped portion between the adjoining bars in this tubular unit is cut off by the cutting device. As indicated in FIG. 9, the cutting device consists of flying cutters m and n symmetrically arranged in the vertical direction around the steel bar path. The flying cutter m has a U-shaped linkage provided between a rotatable shaft RB and a fixed shaft 53. The linkage is composed of a rotatable arm 45, a swing arm 51 and a parallel member 49. One end of arm 45 is fixed to the rotatable shaft RB and the other end of arm 45 is pivotally connected at **47*a* to one end of parallel member 49. The other end of parallel member 49 is pivotally connected at 47*b* to the bottom end of swing arm 51, and the top end of swing arm 51 is fitted to fixed shaft 53 to be rotatable about shaft 53. The flying cutter n is of the same construction as the flying cutter m, elements 46, 50, 52, RB' and 54 of cutter n corresponding to elements 45, 49, 51, RB and 53 of cutter m, respectively. At the opposed centers of the parallel members 49 and 50 there are provided, e.g., pointed aluminum cast heaters 57 and 58 by means of fittings 571 and 581, first ends of which are pivotally connected as at 41 and 42, and second ends of which are spring supported as at 55 and 56. The points of the heaters 57 and 58 are set to be in contact with each other. The arms 45 and 46, which are driven by a drive, not shown, via the rotatable shafts RB and RB', are designed to be rotatable only in the directions o and o'. The positions of RB, RB' and 53, 54 and the lengths of 45, 46, and 51,52 are set such that when the arms 45 and 46 turn in the directions of arrows o and o' from the position indicated in FIG. 9, the swing arms 51 and 52 initially turn to a specified angle only in the directions of arrows p and p'. Upon further rotation of 45 and 46, arms 51 and 52 turn back by only a specified angle in the directions q and q'. Thus with the rotation of 45, 46 in the directions o, o' the points of the heaters 57 and 58** will respectively trace the loci z and z'.

Meanwhile, at the rear of the cutting device on the steel bar path there is installed a detector 43, such as a limit switch or photoelectric switch, to detect passage of the trailing end of each steel bar R. The taped portion between adjoining bars R is a hollow tubular tape, and the other portions are solid with bars R. Therefore, it is easy for the detector 43 to detect the moment that the trailing end of each bar R passes the switch. Before the trailing end of the bar R is detected by the switch, the rotatable arms 45 and 46 are in the state of being turned by a specified angle around the rotatable shafts RB and RB' in the directions o and o', while the parallel member 49 and the swing arm 51 are turned around the fixed shaft 53 in the direction p, and the parallel member 50 and the swing arm 52 are turned around the fixed shaft 54 in the direction p'. In this state there is maintained between the heaters 57 and 58 a gap at least wide enough to allow the taped bar R to freely pass. When the bar R continues movement, and when t'' seconds pass after detection of the trailing end by the switch 43, the rotatable arms 45 and 46 turn in the directions o and o'. As a consequence, the parallel member 49 and the swing arm 51 turn around the fixed shaft 53 in the direction q, while the parallel member 50 and the swing arm 52 turn around the fixed shaft 54 in the direction q'. The steel bar feed rate is so set with respect to the rotating speeds of RB and RB' that the midpoint of the interval between the trailing and leading ends of adjacent steel bars will coincide with the contacting of the heaters 57 and 58. Therefore, the successively fed steel bars can be thermally separated at the tubular taped portions. The bars R thus separated are sent on to the roller conveyor 60 provided adjacent to the discharging device 78. Conclusion of the specified action of the flying cutters is detected by a detector 44, such as a limit switch. In t''' seconds after the detection of when the steel bar R has sufficiently advanced and when the trailing end thereof has reached a specified position, the discharging device 78 is operated.

Figure 10:
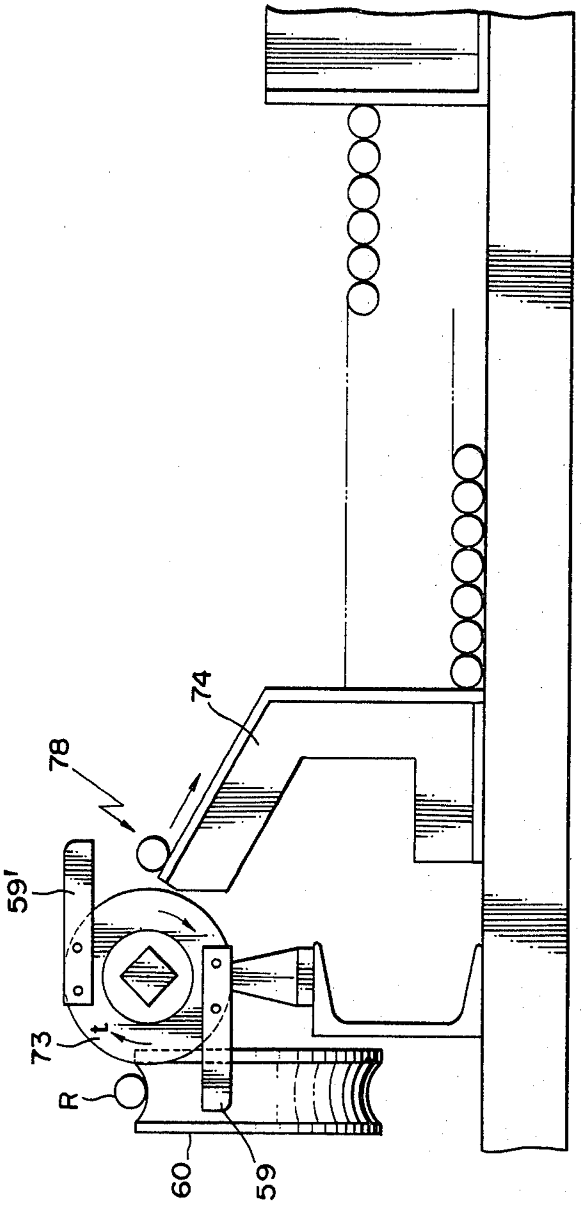
FIG. 10 is a side view of a steel bar discharging device preferably used in the system of the present invention.

The discharging device 78, as illustrated in FIG. 10, includes rotating bodies 73, each having a pair of transfer or kicking devices 59 and 59' spaced 180° from each other and extending from side surfaces thereof, bodies 73 being disposed with a specified spacing therebetween. Extending across the rotating bodies 73, on the side thereof opposite from the roller conveyor 60, there is provided an inclined plate 74 for delivery of the steel bars. Upon receiving a detection signal when in the position shown in FIG. 10, the rotating body 73 turns 180° in the direction t. During this movement, the transfer device 59 picks up the steel bar R positioned on the roller conveyor 60 and moves to the position of the device 59', as shown in FIG. 10. The steel bar R thus drops down onto the inclined plate 74. Then the steel bar R slides under its own weight down the plate 74 to a specified position.

According to the present invention, in the above described manner the steel bars continuously fed by the charging device are separated one by one at the separator A and are then supplied to the roller conveyor. Then, at the axial interval regulating device B, the intervals between the bars successively supplied to the conveyor are regulated. At the coating device C, the parallel portions, excepting the threaded portions, are coated. At the taping device D the bars thus coated are tightly wrapped with an endless thermo-shrinking tape and then sent on to the cutter F by the caterpillar E. At the cutter F the hollow tubular taped portions between adjacent of the steel bars thus coated and taped are cut off to separate the bars. These individual bars are then placed on the roller conveyor 60 and are supplied to a specified position by means of transfer or kicking devices. The above sequence of opertions of the present invention can be fully automatated from the charging to the discharging of the steel bars.

The major advantages of the present invention are as follows:

(1) The entire process from the charging to the discharging of the steel bars can be made fully automatic. Therefore, the efficiency of coating of unbonded PC steel bars is much higher than in the conventional manual method, and also there results a substantial saving of manpower.

(2) The axial interval regulating device utilizing a spacer which is movable back and forth along the steel bar path and the difference in speed between one steel bar and the next succeeding steel bar can simply and accurately correct and equalize the irregular intervals between the steel bars fed by the charging station, and once the interval between adjacent steel bars is regulated, it can be maintained up to the discharging station. Therefore, by appropriately setting the bar feed rate it is possible to very exactly set the acting point of the coating device and the cut position of the hollow tubular taped portion of the cutting station.

(3) At the coating station it is possible, through the combination of the outer nozzle, the inner nozzle and the photoelectric switch to form a coating layer only on the parallel portions of the steel bars during the steel bar feeding process.

(4) At the taping station D the steel bars, which were coated on the parallel portions thereof at the coating station C, are continuously wrapped with a thermo-shrinking tape, and with further movement of the steel bars the heater heats the tubular taped portions. Thus, the tape can easily be tightly fitted around the bars including the coating layer.

(5) The steel bar thus constituted is sent to the cutting station F by the caterpillar E. In the caterpillar employed in the present invention, it is easy to match the distance between the conveyor belts V and W, which depends on the lower chain holder 39 of the conveyor belt V and the upper chain holder 40 of the conveyor belt W, to the steel bar diameter by changing the intersecting angle of the adjusting members 381 and 411 which are pivotally connected in an X-fashion. Further, when such distance has been set to match the parallel portion of the steel bar and the threaded portion is smaller or slightly larger in diameter than the parallel portion, then such difference is elastically compensated.

(6) Steel bars carried on the caterpillar E to the cutting station are thermally cut off at the hollow tubular taped portion between adjacent bars by a heater composed of two cutters, utilizing the bar intervals regulated at the axial interval regulating station, thereby assuring exactness and simplicity of the process.

(7) Moreover, according to the present invention, the coating process of unbonded PC steel bar can be performed automatically with rapidity. Thus, unlike the conventional method, an extremely favorable working environment can be secured when using a relatively cheap coating agent such as asphalt with virtually no generation of irritant, harmful fumes.

(8) The outstanding features of the present invention are that, in spite of irregularity in the lengths of steel bars charged, the steel bars can be transmitted with regular intervals therebetween, that steel bars of different diameters can be handled in a simple operation, that a coating layer of desired thickness can be reliably formed, and that the feed intervals can be arbitrarily set, if necessary.

Although the present invention has been described and illustrated with regard to specific preferred structural and operational features thereof, it is to be understood that various modifications may be made to such specific features without departing from the scope of the present invention.

What is claimed is:

1. A system for continuously coating unbonded PC steel bars moving along one after the other in an axial path, said system comprising:

an axial interval regulating device including first and second pairs of pinch rollers positioned upstream and downstream, respectively with respect to said axial path, a spacer movable between first and second specific points upstream and downstream, respectively of said upstream pair of pinch rollers along said axial path, means for separately moving said pinch rollers toward and away from said axial path, and means for moving said spacer back or forth between said first and second points;

a coating device including an outer nozzle, an inner nozzle positioned within said outer nozzle, said outer nozzle having therethrough a coating agent outflow path, and said inner nozzle being shiftable toward and away from said outer nozzle along said axial path to thereby block and clear said coating agent outflow path;

a taping device for applying tape around a plurality of said steel bars, thus axially joining said steel bars;

a transfer mechanism including a pair of symmetrical conveyor units vertically spaced from each other by a specified spacing on opposite sides of said axial path, each said unit including a chain belt stretched over spaced rotating bodies, each said conveyor unit including an upper chain holder in contact with the underside of the upper run of the respective said belt and a lower chain holder in contact with the inner side of the lower run of said respective belt, said upper chain holder and said lower chain holder being connected by a coupling member, the distance between the top side of said upper chain holder and the underside of said lower chain holder being greater than the diameter of said rotating bodies, a first fitting member provided adjacent to one end of said lower chain holder of the upper said conveyor unit, a second fitting member provided adjacent to the other end of said upper chain holder of the lower said conveyor unit, a first adjusting member connecting said first and second fitting members, a third fitting member provided adjacent to the other end of said lower chain holder of said upper conveyor unit, a fourth fitting member provided adjacent to one end of said upper chain holder of said lower conveyor unit, a second adjusting member connecting said third and fourth fitting members, said first and second adjusting members intersecting in an X-fashion and being pivotally connected, said lower chain holder of said upper conveyor unit and said upper chain holder of said lower conveyor unit thus being interlocked so that they may be displaced toward and away from each other, and said chain holders being mounted to be elastically slightly displaceable from each other; and a cutting device including a pair of members symmetrically positioned on opposite sides of said axial path, each said member including a rotatable shaft, a rotatable arm having a first end fixed to said rotatable shaft, a fixed shaft, a swing arm having a first end coupled to said fixed shaft, a parallel member connected to second ends of said swing arm and said rotatable arm, and a cutter located substantially at the midpoint of said parallel member, said cutter including a heater, and the arrangement being such that by simultaneous opposite rotation of said rotatable arms of said two members, hollow tubular taped portions between adjacent said steel bars can be thermally severed by contact of said heaters of said two members.

2. An axial interval regulating device for use in a system for continuously coating unbonded PC steel bars, said device comprising:

first and second pairs of pinch rollers positioned upstream and downstream, respectively, with respect to a steel bar axial path;

a spacer movable between first and second specific points upstream and downstream, respectively, of said upstream pair of pinch rollers along said path;

means for separately moving said pinch rollers toward and away from said path; and means for moving said spacer back or forth between said first and second points.

3. A transfer mechanism for use in a system for continuously coating unbonded PC steel bars, said mechanism comprising:

a pair of symmetrical conveyor units vertically spaced from each other on opposite sides of a steel bar path, each said unit including a chain belt stretched over spaced rotating bodies and adapted to grip therebetween a steel bar;

each said conveyor unit including an upper chain holder in contact with the underside of the upper run of the respective said belt and a lower chain holder in contact with the inner side of the lower run of said respective belt, with said upper chain holder and said lower chain holder being connected by a coupling member, and the distance between the top side of said upper chain holder and the underside of said lower chain holder being greater than the diameter of said rotating bodies;

a first fitting member attached to one end of said lower chain holder of the upper said conveyor unit, a second fitting member attached to the other end of said upper chain holder of the lower said conveyor unit, and a first adjusting member connecting said first and second fitting members;

a third fitting member attached to the other end of said lower chain holder of said upper conveyor unit, a fourth fitting member attached to one end of said upper chain holder of said lower conveyor unit, and a second adjusting member connecting said third and fourth fitting members;

said first and second adjusting members crossing in an X-fashion and being pivotally connected, said lower chain holder of said upper conveyor unit and said upper chain holder of said lower conveyor unit thus being interlocked so that they may be displaced toward and away from each other; and means for mounting said chain holders of said upper conveyor unit to be elastically slightly displaceable from said chain holders of said lower conveyor unit when said conveyor units are gripping therebetween a steel bar.

* * * * *